(12) United States Patent
Liu et al.

(10) Patent No.: US 9,646,357 B2
(45) Date of Patent: May 9, 2017

(54) GRAPHIC RENDERING

(71) Applicant: Alibaba Group Holding Limited, Grand Cayman (KY)

(72) Inventors: Hujia Liu, Hangzhou (CN); Junjie Tao, Hangzhou (CN); Wenxiang Zhu, Beijing (CN); Mingjian Wang, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 200 days.

(21) Appl. No.: 14/049,038

(22) Filed: Oct. 8, 2013

(65) Prior Publication Data

US 2014/0098118 A1    Apr. 10, 2014

(30) Foreign Application Priority Data

Oct. 9, 2012  (CN) ........................... 2012 1 0379921

(51) Int. Cl.
*G06T 1/00* (2006.01)
*G06F 9/455* (2006.01)
*G06F 9/44* (2006.01)

(52) U.S. Cl.
CPC ............ *G06T 1/00* (2013.01); *G06F 9/45529* (2013.01); *G06F 9/4445* (2013.01)

(58) Field of Classification Search
CPC ...... G06T 1/00; G06F 9/45529; G06F 9/4445
USPC ........................................................ 345/522
See application file for complete search history.

(56) References Cited

U.S. PATENT DOCUMENTS 6,289,299 B1    9/2001  Daniel, Jr. et al.
8,561,038 B1 *  10/2013 Sams ............................ 717/140
2007/0171222 A1 * 7/2007  Kowalski .................... 345/420
2010/0118039 A1    5/2010  Labour
2012/0117145 A1 * 5/2012  Clift ...................... A63F 13/12
                                                    709/203
2012/0169754 A1    7/2012  Pesonen et al.
2012/0266061 A1    10/2012 Williamson et al.
2012/0287168 A1 * 11/2012 Botzas et al. ................ 345/690

(Continued)

FOREIGN PATENT DOCUMENTS

CN         102087598 A       8/2011

OTHER PUBLICATIONS

Levkowitz, et al., "Cloud and Mobile Web-Based Graphics and Visualization", 2012 XXV SIBGRAPI Conference on Graphics, Patterns and Images Tutorials, IEEE, Aug. 22, 2012, pp. 21-35.

(Continued)

*Primary Examiner* — Ke Xiao
*Assistant Examiner* — Kim-Thanh T Tran
(74) *Attorney, Agent, or Firm* — Lee & Hayes, PLLC

(57) ABSTRACT

The present disclosure provides example methods and apparatuses of conducting graphic rendering. JavaScript codes of a graphic application are obtained. The JavaScript codes include an API corresponding to a rendering function based on OPENGL. The API has a format complying with a standard of HTML5 Canvas. The JavaScript codes are executed at a parsing engine. When the API of the JavaScript codes is executed, the parsing engine parses the API to obtain a corresponding rendering function based on OPENGL. The rendering function is called to conduct graphic rendering to a rendering target. The present techniques improve a speed of graphic rendering at a mobile device.

20 Claims, 4 Drawing Sheets

(56) References Cited

U.S. PATENT DOCUMENTS

| | | |
|---|---|---|
| 2012/0299932 A1 | 11/2012 | Cordara et al. |
| 2013/0002680 A1 | 1/2013 | Cornell |
| 2013/0002705 A1 | 1/2013 | Cornell |
| 2013/0057540 A1* | 3/2013 | Winnemoeller ........ G06T 15/80 345/419 |
| 2013/0120368 A1* | 5/2013 | Miller et al. .................. 345/419 |
| 2013/0272394 A1 | 10/2013 | Brockmann et al. |

OTHER PUBLICATIONS

The PCT Search Report and Written Opinion mailed Dec. 20, 2013 for PCT application No. PCT/US13/63916, 11 pages.
Chinese Office Action Translation for Application No. 201210379921.4, mailed on May 20, 2016, Liu, et al., "Method and Device for Graphic Rendering on Mobile Device", 10 pages.

\* cited by examiner

GRAPHIC RENDERING

CROSS REFERENCE TO RELATED PATENT APPLICATIONS

This application claims foreign priority to Chinese Patent Application No. 201210379921.4 filed on 9 Oct. 2012, entitled "Method and Apparatus of Graphic Rendering at a Mobile Device," which is hereby incorporated by reference in its entirety.

TECHNICAL FIELD

The present disclosure relates to the field of graphic rendering, and more particularly, to a method and an apparatus of graphic rendering at a mobile device.

BACKGROUND

There have been more and more applications on mobile devices, and these applications are getting more and more complicated. The applications use graphic rendering when displaying graphics. For example, a graphic displaying of a web game at the mobile device requires graphic rendering. The graphic rendering converts a high level description of an object into graphics displayed on a displaying device. For example, graphic rendering occurs in a process that converts a mathematical model of a three-dimensional object, e.g., a 3D object or scene, into bitmap graphics. Another example of graphic rendering is to convert a Hypertext Markup Language (HTML) file into graphics displayed on a monitor screen.

There are two major applications of the graphic rendering.

A first application is at a web browser. Among internet technologies, HTML5 is a new and popular technology. It has also become popular to use Canvas standard of HTML5 to process graphic rendering at the web browser. However, at most mobile devices, web browsers use the HTML5 Canvas standard as a node controlling component of HTML so that operations such as a layout logic, an event, or a redrawing require using the node tree of HTML. A CPU is forced to process many operations due to such complicated logics. The graphic application or game that uses the above technology often has a pitfall of slow graphic rendering.

A second application is at a game client. In the conventional technologies, a client of a game application is developed by using C++ or Java codes and a process of graphic rendering is executed by a GPU. However, the client of the game application needs downloading and installing. In addition, its updating is also troublesome. As a result, a person skilled in the art often tries to improve a speed of the graphic rendering at the mobile device.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

The present disclosure provides an apparatus and a method of graphic rendering at a mobile device to improve a speed of the graphic rendering at the mobile device.

The present disclosure provides an example method of graphic rendering at the mobile device.

JavaScript codes of a graphic application are obtained. The JavaScript codes include an API corresponding to a rendering function based on OPENGL. The API has a format complying with a standard of HTML5 Canvas.

The JavaScript codes are executed at a parsing engine. When the API of the JavaScript codes is executed, the parsing engine parses the API to obtain a corresponding rendering function based on OPENGL.

The rendering function is called to conduct graphic rendering to a rendering target.

For example, the example method may also include operations of encapsulating the rendering function based on OPENGL into or with the API. For instance, the rendering function based on OPENGL is encapsulated into or with the corresponding API according to an expansibility of the parsing engine. The API is exposed to a JavaScript developer, and the API has a format complying with the standard of HTML5 Canvas.

For example, the rendering function is an interface function which is obtained based on an encapsulation of a function based on an OPENGL format.

For example, the operations of calling the rendering function to conduct graphic rendering to a rendering target may include the following. The parsed rendering function conducts a second parsing to obtain a function with a corresponding OPENGL format. The parsed function with the corresponding OPENGL format is called to conduct graphic rendering to the rendering target.

For example, the rendering function includes an initialization rendering function that initializes a low level rendering environment.

For example, the example method may further include the following. Based on a platform attribute of the mobile device, the initialization rendering function is called to obtain corresponding rendering data. The rendering data may contain device hardware information.

A hardware capability of the mobile device is evaluated according to the device hardware information. An optimization strategy of a rendering process is adjusted according to the hardware capability of the mobile device. The operations of calling the rendering function to conduct graphic rendering to the rendering target may further include the following. Based on the adjusted optimization strategy of the rendering process, the rendering function is called to conduct graphic rendering.

The present disclosure also provides an example apparatus of graphic rendering at the mobile device. The example apparatus may include a code retrieving module, a code execution module, and a function calling module.

The code retrieving module obtains JavaScript codes of a graphic application. The JavaScript codes include an API corresponding to a rendering function based on OPENGL. The API has a format complying with a standard of HTML5 Canvas.

The code executing module executes the JavaScript codes at a parsing engine. When the API of the JavaScript codes is executed, the parsing engine parses the API to obtain a corresponding rendering function based on OPENGL.

The function calling module calls the parsed rendering function to conduct graphic rendering to a rendering target.

For example, the example apparatus may further include an encapsulating module that encapsulates the rendering function based on OPENGL into or with the API. For instance, the encapsulating module, according to an expansibility of the parsing engine, encapsulates the rendering function based on OPENGL into or with the corresponding API. The API is exposed to a JavaScript developer, and the API has a format complying with the standard of HTML5 Canvas.

For example, the rendering function is an interface function which is obtained based on an encapsulation of a function based on an OPENGL format.

For example, the function calling module may further include a second parsing sub-module and a calling sub-module. The second parsing sub-module conducts a second parsing to the parsed rendering function to obtain a function with a corresponding OPENGL format. The calling sub-module calls the parsed function with the OPENGL format to conduct graphic rendering to the rendering target.

For example, the rendering function includes an initialization rendering function that initializes a low level rendering environment.

For example, the example apparatus may further include an environment initializing module, an evaluating module, and a rendering process optimization strategy adjusting module. The environment initializing module, based on a platform attribute of the mobile device, calls the initialization rendering function to obtain corresponding rendering data. The rendering data may contain device hardware information.

The evaluating module evaluates a hardware capability of the mobile device according to the device hardware information. The rendering process optimization strategy adjusting module adjusts an optimization strategy of a rendering process according to the hardware capability of the mobile device. The calling module, based on the adjusted optimization strategy of the rendering process, calls the rendering function to conduct graphic rendering.

Compared with the conventional techniques, the present techniques have at least the following advantage.

The conventional web browsers basically support an API of HTML5 Canvas standard. However, the web browsers use the HTML5 Canvas standard as a node controlling component of HTML so that operations such as layout logic, an event, or a redrawing require using the node tree of HTML. A CPU is forced to process a lot of operations due to such complicated logics, thereby causing a low speed of graphic rendering.

The present techniques also implement the API of HTML5 Canvas standard in HTML5. However, according to the present techniques, the parsing engine in the executing process parses the API to obtain a corresponding rendering function based on OPENGL. The rendering function based on OPENGL may fully take advantage of GPU rendering graphic interface at the mobile device and more reasonably use a video card for graphic rendering. Thus, the present techniques may further improve performance of graphic rendering at the mobile device with a compatible web browser and operating system.

In addition, a developer is familiar with HTML5 and the HTML5 Canvas API. Thus, there is no learning cost for the developer to develop graphic application by using the familiar API. Compared with the conventional WebGL technique that requires higher learning costs, the present disclosure reduces the learning cost of the graphic application, thereby achieving an efficient development of graphic applications.

Furthermore, a client of a game application under the conventional techniques is developed by using C++ or Java codes for the graphic application and needs graphic rendering by the GPU. However, the C++ or Java codes are codes that need compiling and installation prior to execution. Thus, game applications under the conventional techniques need downloading and then installing. In addition, updating a game application is also troublesome. However, JavaScript codes used by the present techniques are directly downloadable and can be executed while parsed. Thus, the JavaScript codes have advantages that cannot be found in C++ and Java codes. It is not necessary for installation and it is possible to update at any time. Thus, the graphic applications developed by the present techniques do not necessary require installation and have easy updating and operating.

BRIEF DESCRIPTION OF THE DRAWINGS

To better illustrate the embodiments of the present disclosure, the following is a brief introduction of the FIGs to be used in the description of the embodiments. It is apparent that the following FIGs only relate to some embodiments of the present disclosure. A person of ordinary skill in the art can obtain other FIGs according to the FIGs in the present disclosure without creative efforts.

DETAILED DESCRIPTION

In order to easily illustrate the purposes, features, and advantages of the present techniques, the following description is described by reference to the FIGs and example embodiments.

The present techniques design an API of JavaScript codes, and call a low level rendering function based on OPENGL to conduct graphic rendering to a rendering target when the API of the JavaScript codes is executed. As the present techniques avoid a lot of logic operations that happen under the conventional techniques that treat the HTML5 Canvas standard as a HTML node controlling component in a browser, the present techniques may directly conduct rendering operations to the rendering target, thereby avoiding many unnecessary operations and improving a rendering speed.

In addition, when the present techniques conduct graphic rendering to the rendering target, the present techniques call the rendering function based on OPENGL. As the rendering function based on OPENGL may efficiently use a graphic rendering interface at the mobile device, the present techniques may more reasonably use a video card for rendering. Thus, the present techniques may enhance graphic rendering performance at the mobile device with a compatible browser and operating system. Table 1 lists explanations of some technical terms as follows:

TABLE 1

| Technical Terms | Explanations |
| --- | --- |
| GPU | Graphic Processing Unit |
| API | Application programming Interface |
| JavaScript | JavaScript is a prototype-based inheritance, object-oriented, dynamic, and case sensitive client-end scripting language, whose goal is to provide smooth surfing effects at a client. |
| V8 engine | An open source JavaScript engine developed by Danish Google ™, which is used in browsers, such as Google ™ Chrome. |
| OPENGL | Open Graphics Library defines specifications of a cross-language, multi-platform application programming interface, which is used to render 2D and 3D images. |
| OPENGL ES 2.0 | OPENGL for Embedded Systems 2.0 is a subset of OpenGL 3D graphic API, which is designed for embedded devices such as a mobile phone, a PDA, and a video game console. 2.0 is a version number. OPENGL ES 2.0 is defined based on the specification of OpenGL 2.0. |
| 2D/3D | Two-dimensional rendering technology and three-dimensional rendering technology or 2D/3D graphic technology. |
| CloudApp | A cloud graphic application |
| Canvas | A graphic canvas in a program, which refers to a Canvas component in HTML 5 that obtains 2D/3D rendering context. |
| WebGL | A 3D standard based on a browser. |

Figure 1:
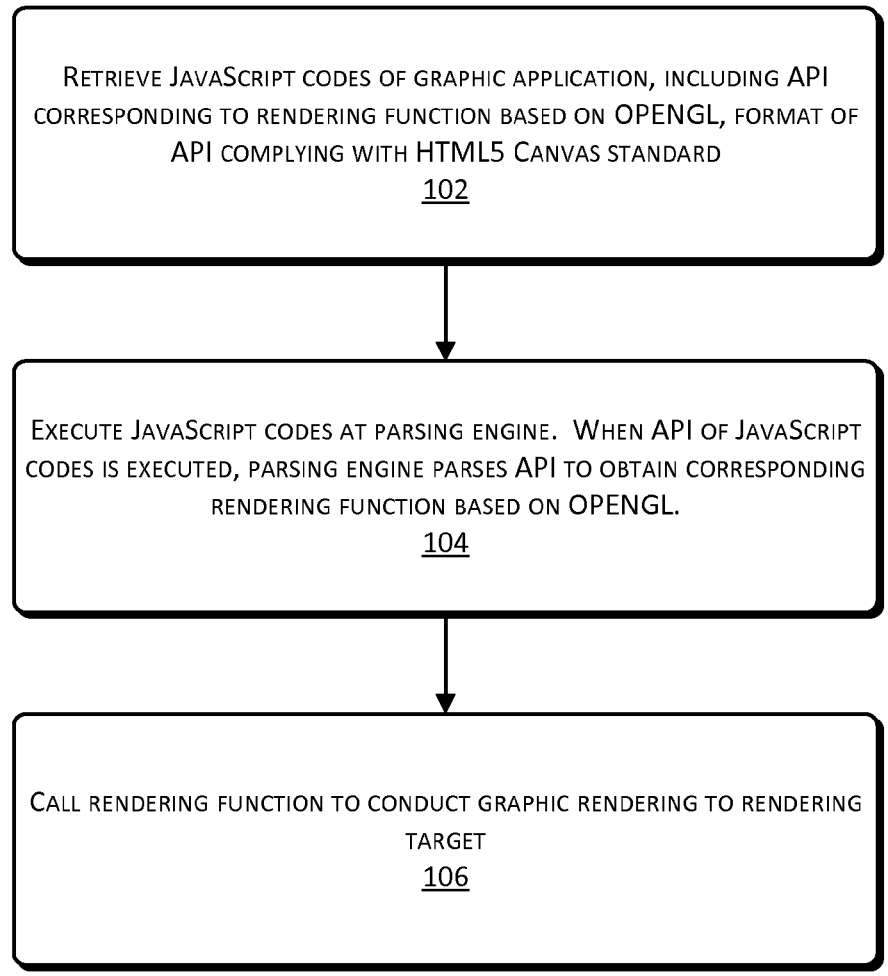
FIG. 1 is a flow chart of an example method of graphics rendering at a mobile device according to an example embodiment of the present disclosure.

FIG. 1 shows a flowchart illustrating an example method of graphic rendering at a mobile device according to an example embodiment of the present disclosure.

At 102, JavaScript codes of a graphic application are retrieved. The JavaScript codes include an API corresponding to a rendering function based on OPENGL. The API has a format complying with a standard of HTML5 Canvas.

At 104, the JavaScript codes are executed at a parsing engine. When the API of the JavaScript codes is executed, the parsing engine parses the API to obtain a corresponding rendering function based on OPENGL.

At 106, the rendering function is called to conduct graphic rendering to a rendering target.

For example, the rendering function based on OPENGL, such as OPENGL ES 2.0, may fully leverage a graphic rendering interface of the GPU at the mobile device. The parsing engine provides a flexible extension function interface to enhance a flexibility of JavaScript codes and provide a capability to the JavaScript codes of calling OPENGL library at a low level C++. The present disclosure, based on the above advantages of JavaScript and OPENGL, provides a solution of graphic rendering complying with an API of HTML5 Canvas at the mobile device, and thus the present techniques increase a speed of the graphic rendering at the mobile device and enhance an effect of graphic rendering at the mobile device.

In an example embodiment of the present disclosure, the parsing engine provides an extensible operating environment for the JavaScript codes. Specifically, the parsing engine parses and executes the JavaScript codes. Furthermore, the parsing engine has flexibility and may provide various flexible interfaces to extension functions.

For example, the parsing engine may include: Nitro of Apple™ Safari, V8 of Google™ Chrome, TraceMonkey of Mozilla™ Firefox 3.5, SpiderMonkey of Mozilla™, etc. The present disclosure does not impose restriction into any specific parsing engine.

For example, the JavaScript codes of the present disclosure may include Canvas program of HTML5 developed by JavaScript developers, which may be applied in various scenarios.

For example, an example apparatus or system of the present techniques may be embedded in a browser or act as a plug of the browser. In this example, the JavaScript codes are JavaScript codes of the browser.

As another example, the present disclosure may be applied in the development of graphic rendering portion in the graphic applications. The graphic applications, for example, may include the browser, a game application, a chatting program, or any other program that requires graphic expressions. With respect to graphic interface and gaming illustration expression techniques at the mobile device, the OPENGL ES 2.0 may be utilized to effectively execute graphic rendering as it reasonably uses the GPU equipment, which brings good performance experiences for the game application.

However, it is difficult for the developer and may cost a long developing period to directly call an interface of OPENGL ES 2.0 for development. According to the present techniques, the JavaScript developer can directly call an API of HTML5 to implement the powerful graphic capabilities of OPENGL. The developer may easily develop various graphic applications with graphic rendering performance similar to those of OPENGL, if the developer learns JavaScript language and a development method of 2D/3D HTML5 Canvas.

Furthermore, the present techniques may be applicable in executing graphic rendering portion of graphic applications. In an operating process of the graphic application, the present techniques may implement the graphic rendering at a high speed with high performance. In addition, the JavaScript codes used in the present techniques may be codes that are directly downloadable so that the codes are parsed while they are executed. Therefore, the use of JavaScript codes has advantages not found in C++ and Java codes, which do not require installation and may update and operate at any time. Thus, compared with the conventional techniques, graphic applications developed by the present techniques do not necessarily require installation, update easily, and operate conveniently.

For another example, the example method may also include operations of encapsulating the rendering function based on OPENGL into or with the API. The rendering function based on OPENGL is encapsulated into the corresponding API according to an expansibility of the parsing engine. The API is exposed to a JavaScript developer, and the API has a format complying with the standard of HTML5 Canvas.

In detailed implementations, for instance, the present techniques may preserve an interface of the parsing engine while the API is encapsulated. Thus, when the API of the JavaScript codes is executed, the API is parsed according to the preserved interface of the parsing engine. The encapsulated API as a result of the encapsulation may have a mapping relationship with the rendering function based on OPENGL. The mapping relationship may be a one-to-one, one-to-many, or many-to-many mapping relationship. The present techniques encapsulate the rendering function based on OPENGL to the corresponding API according to extensibility of the parsing engine and provide the API to the JavaScript developer. The present disclosure does not impose any restrictions on the detailed extensibility and the corresponding mapping relationship.

Codes of an example encapsulated API ctx.drawImage are illustrated as follows:

```
class_proto-
>Set(v8::String::New("drawImage"),FunctionTemplate::New(V8Graphics
Context::DrawImage))
```

In the example, a class_proto object is encapsulated into an API called drawImage. A rendering function that the API corresponds and finally implements is V8GraphicsContext:: DrawImage function in C++. The class_proto is a low level object template corresponding to a ctx object. Accordingly, ctx.drawImage( ) interface is extended and exposed to the JavaScript codes. When the API of the JavaScript codes is executed, a parsing operation is processed to find the V8GraphicsContext::DrawImage function that is to be finally executed, which is the rendering function based on OPENGL that efficiently uses the graphic rendering interface of GPU at the mobile device to reasonably use a video card for rendering.

Many other APIs such as ctx.drawImage, ctx.fillRect, ctx.fillText, and ctx.strokeText may be extended and exposed to the JavaScript codes. Some code examples are illustrated as follows.

```
Class_proto->Set(v8::String::New("fillRect"),FunctionTemplate::New(
V8GraphicsContext::FillRect));
    class_proto->Set(v8::String::New("fillText"),FunctionTemplate::New(
V8GraphicsContext::FillText));
    class_proto-
>Set(v8::String::New("strokeText"),FunctionTemplate::New(V8Graphics
Context::StrokeText))
```

In an example embodiment, a set of graphic engines based on OPENGL ES 2.0 may be integrated to implement the rendering functions based on OPENGL, which may be in C++ language and rely on OPENGL such as OPENGL ES 2.0 class libraries. Thus, the graphic engine of the present disclosure stores a lot of rendering functions in C++ to be called by the parsing engine. As OPENGL ES 2.0 is a conventional technology, the present disclosure does not impose any restrictions to the detailed integration method of the graphic engine.

In a practical implementation, the graphic rendering should be processed based on the condition that the graphics engine has been successfully operated. If the OPENGL graphics standard library is successfully operated, it may also ensure a successful start of the graphics engine.

Moreover, the OPENGL graphics standard libraries may also be operated in various operating systems, such as Android™, Symbian™, Linux™, and Windows™. Thus, the graphic engine may also be successfully started in various operating system environments. As a result, the embodiments of the present disclosure may be applied to various operating systems, such as Android™, Symbian™, Linux™, and Windows™.

As a whole, the present techniques mainly combine advantages of both JavaScript and OPENGL to use the parsing engine to encapsulate the rendering function based on OPENGL into or with the API complying with the HTML5 Canvas 2D/3D standard. Thus the present techniques not only increase the speed of graphic rendering at the mobile device but also improve the effect of graphic rendering at the mobile device.

For example, the rendering function may be an interface function which is obtained by an encapsulation function based on an OPENGL format. The operations of calling the rendering function to conduct graphic rendering to the rendering target may include the following. The parsed rendering function conducts a second parsing to obtain a function with a corresponding OPENGL format. The parsed function with the corresponding OPENGL format is called to conduct graphic rendering to the rendering target.

In an example implementation, the function with OPENGL format may be encapsulated to obtain an interface function with a format similar to HTML5 Canvas standard format to improve a convenience of implementation of the API and the parsing engine. For example, the above V8GraphicsContext::DrawImage function in C++ is an interface function that has been encapsulated. In fact, the function with OPENGL format before the encapsulation is glDrawElements.

For another example, the rendering function may include an initialization rendering function that initializes a low level rendering environment. For instance, the low level rendering environment may include a brush, a canvas, etc. The brush is an initiator of a drawing command and the canvas is a mapping of memory.

In an example implementation, the rendering target is obtained when the API of the JavaScript code is initially executed. The corresponding extension interfaces may be parsed to obtain drawing tools, such as a canvas and a brush, to initialize the low level rendering environment. The rendering target may be an OPENGL surface provided by a system, such as a buffer within a video card. For instance, in the Android™ system, the rendering target may be an Android™ surfaceview (game development framework) or a low level structure corresponding to the canvas in the browser.

In an example implementation, the canvas and brush may be obtained by using JavaScript codes as follows:

```
var canvas = cloudapp.createCanvas(480, 800) /*obtain a 480*800
canvas*/
    var context = canvas.getContext( )   /*obtain a brush*/
```

For another example, the example method may further include the following. Based on a platform attribute of the mobile device, the initialization rendering function is called to obtain corresponding rendering data. The rendering data may contain device hardware information.

A hardware capability of the mobile device is evaluated according to the device hardware information. An optimization strategy of a rendering process is adjusted according to the hardware capability of the mobile device. The operations of calling the rendering function to conduct graphic rendering to the rendering target may further include the following. Based on the adjusted optimization strategy of the rendering process, the rendering function is called to conduct graphic rendering.

The operations of calling the parsed rendering function to conduct graphic rendering to the rendering target may further include the following. The parsed rendering function is called to conduct graphic rendering to the rendering target according to the adjusted optimization strategy of the rendering process.

In the example embodiment, the present techniques may adjust the optimization strategy of the rendering process according to the hardware capability of the mobile device and optimize the rendering process according to the adjusted optimization strategy of the rendering process to enhance the performance of graphic rendering.

In an example implementation, the optimization strategy of the rendering process may be related to various strategy parameters. Using vertices number (which is a number of pixel points rendered to a screen) as an example parameter, a number of vertices in one rendering may be initially configured. In default, there may be at most 2000 vertices in one rendering. In the rendering process, according to the hardware capability, the number of vertices parameter is changeable. For example, a high quality video card may process 2000 vertices in one rendering while a low quality video card may only process 600 vertices at one rendering. The above 2000 and 600 are strategy parameters that comply with hardware capability.

Therefore, a general rendering process may be as follows. When the calling command, such as V8GraphicsContext::DrawImage, is received, the rendering is not immediately applied to the rendering target. Instead, data is pushed into flexible data queues, such as a vertex queue and an indexing queue. When a length of data queue reaches a strategy parameter, such as 2000, the graphic rendering starts.

In addition to the strategy parameter, the optimization strategy of the rendering process may further include other strategies, such as a color format of a video card, an anti-aliasing capability, a capability of opening z buffer zone, a capability of supporting the template buffer zone, etc. A person skilled in the art may use various optimization strategies of the rendering process according to the actual demands. The present disclosure does not impose any restriction herein.

It should be understood that a person skilled in the art may choose a set of configuration parameters most appropriate to the current hardware environment, such as a screen adaptation parameter, a pixel format parameter (ARGB_8888, etc.), and other parameters related to the video card.

In order to enable a person skilled in the art to better understand the present disclosure, the following is described by reference to actual implementation.

The following describes a first example scenario.

Figure 2:
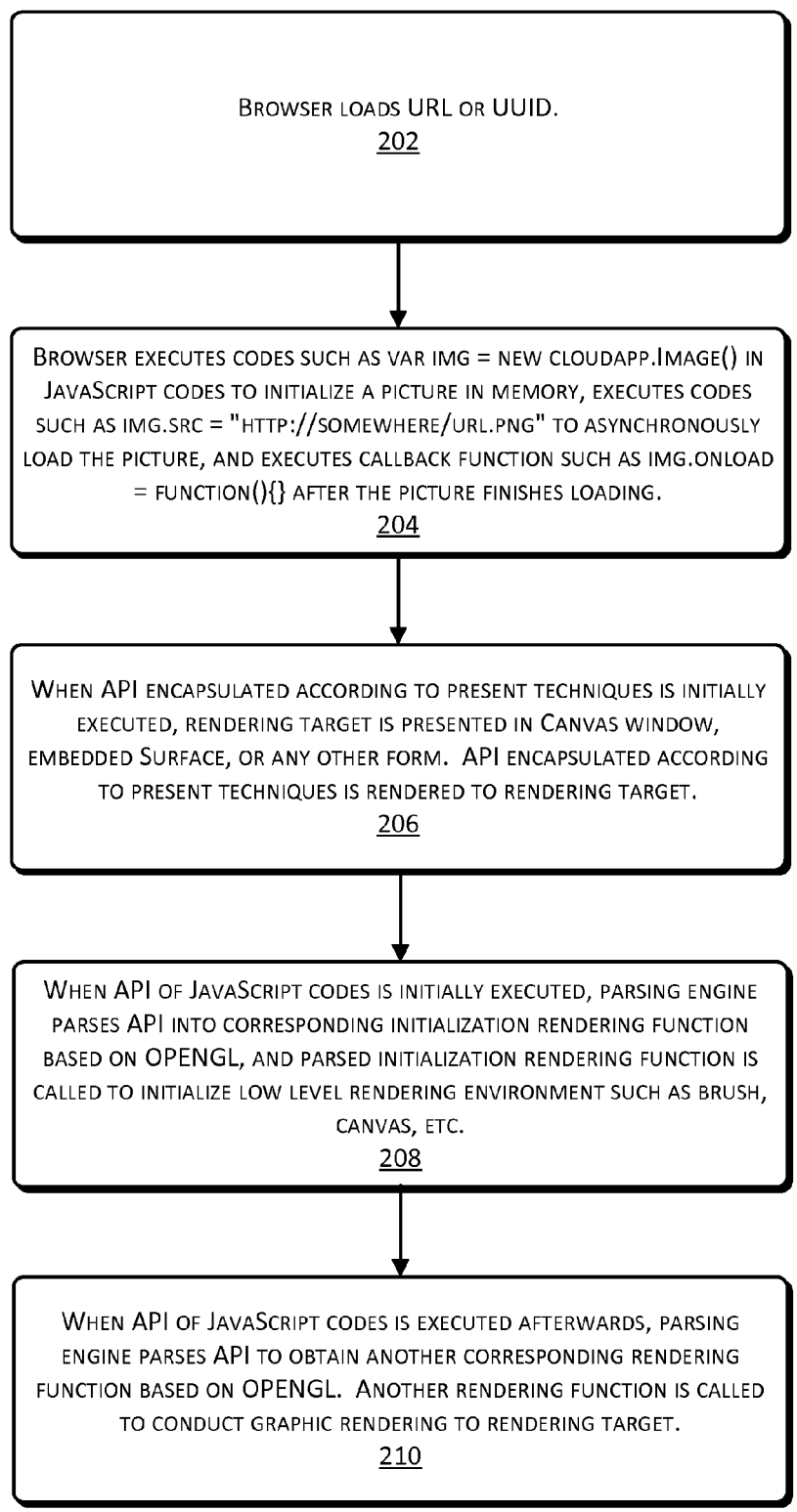
FIG. 2 is a flowchart of an example method of graphics rendering in a browser at the mobile device according to another example embodiment of the present disclosure.

FIG. 2 shows a flowchart illustrating an example method of graphic rendering in a browser of the mobile device according to an example embodiment of the present disclosure.

At 202, the browser loads a uniform resource locator (URL) or a universally unique identifier (UUID). Thereafter, HTML and JavaScript codes are obtained. The JavaScript codes include an API encapsulated according to the present disclosure.

A kernel of the browser has a requesting module complying with hypertext transport protocol (HTTP) that requests codes. For example, when the browser visits a website by using an URL, the browser obtains a homepage such as index.html through the URL and executes the webpage and loads required resources and JavaScript codes. For instance, the present techniques may directly execute the JavaScript codes obtained by the browser.

At 204, the browser executes codes such as var img=new cloudapp.Image( ) in the JavaScript codes to initialize a picture in memory, executes codes such as img.src="http://somewhere/url.png" to asynchronously load the picture, and then executes a callback function such as img.onload=function( ){ } after the picture finishes loading.

At 206, when the API encapsulated according to the present techniques is initially executed, the rendering target may be presented in a form of Canvas window, embedded Surface, or any other form. The API encapsulated according to the present techniques is rendered to the rendering target.

At 208, when the API of the JavaScript codes is initially executed, the parsing engine is used to parse the API into the corresponding initialization rendering function based on OPENGL, and the parsed initialization rendering function is called to initialize a low level rendering environment. The low level rendering environment may include a brush, a canvas, etc.

At 210, when the API of the JavaScript codes is executed afterwards, the parsing engine parses the API to obtain another corresponding rendering function based on OPENGL. The rendering function is called to conduct graphic rendering to the rendering target.

The following is an example of API of the JavaScript codes.

```
var canvas = cloudapp.createCanvas(480, 800) /*obtain a 480*800 canvas*/
var context = canvas.getContext( )   /*obtain a Canvas brush*/
context.drawImage(img, 100, 100, 50, 50)   /*draw a loaded picture at a coordinate (100,100), where its width and height are defined as 50,50*/
```

The conventional browser, such as a browser with webkit kernel, basically supports an API complying with the HTML5 Canvas standard. However, the web browsers use the HTML5 Canvas standard as a node controlling component of HTML so that operations such as layout logic, an event, or a redrawing require using the node tree of HTML. A CPU needs to process a lot of operations due to such complicated logics, thereby causing a low speed of graphic rendering.

The present techniques also implement the API of HTML5 Canvas standard in HTML5. However, the present techniques use the parsing engine to parse the API to obtain a corresponding rendering function based on OPENGL and directly call the rendering function to conduct rendering operations to the rendering target. Thus, the present techniques may avoid many unnecessary operations such as layout logic, event, or redrawing, thereby improving the speed of rendering.

In addition, during the process of conducting graphic rendering to the rendering target, the present techniques call the rendering function based on OPENGL. The rendering function based on OPENGL may fully use the graphic rendering interface of GPU at the mobile device and more reasonably use the video card for rendering. Thus, the present techniques may further improve a graphic rendering performance at the mobile device with a compatible browser and operating system.

In addition, a developer is familiar with HTML5 and the HTML5 Canvas API. Thus, there is no or little training cost for the developer to develop graphic application by using the familiar API. Compared with the conventional WebGL technique that requires higher learning costs, the present disclosure reduces the learning cost of the graphic application, thereby achieving an efficient development of graphic applications.

Furthermore, a client of a game application under the conventional techniques is developed by using C++ or Java codes for the graphic application and needs graphic rendering by the GPU. However, the C++ or Java codes are codes that need compiling and installation prior to execution. Thus the game application under the conventional techniques needs downloading and then installing. In addition, its updating is also troublesome. However, JavaScript codes used by the present techniques are directly downloadable and can be executed while parsed. Thus, the JavaScript codes have advantages that cannot be found in C++ and Java codes. It is not necessary for installation and it is possible to update at any time. Thus, the graphic applications developed by the present techniques do not necessary require installation and have easy updating and operating.

The following describes a second example scenario.

Figure 3:
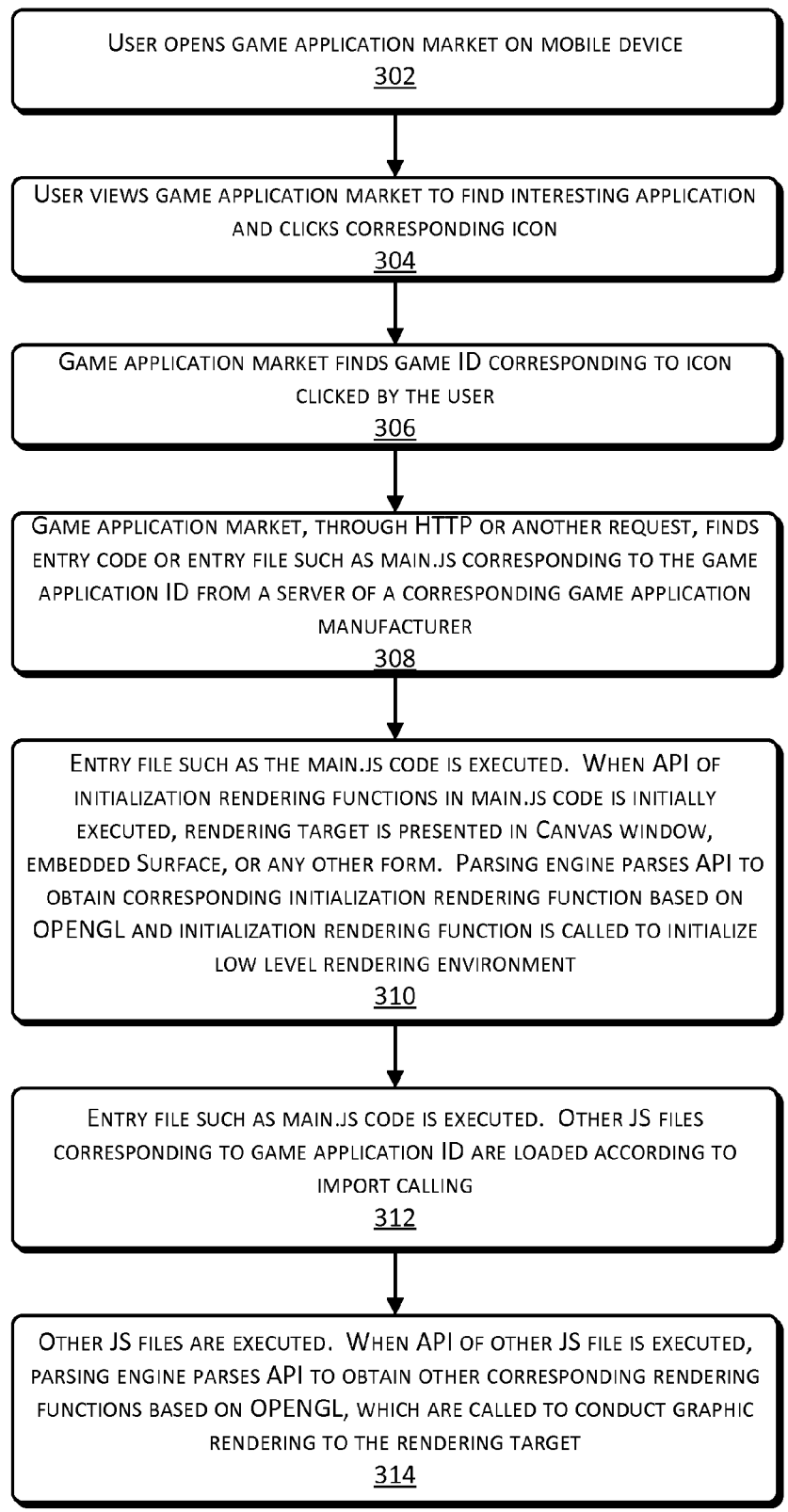
FIG. 3 is a flowchart of an example method of running a game application at the mobile device according to another example embodiment of the present disclosure.

FIG. 3 shows a flowchart of an example method of running a game application at a mobile device according to another example embodiment of the present disclosure.

At 302, a user opens a game application market at the mobile device. That is, the mobile device starts an independent application.

At 304, the user views the game application market to find an interesting application and clicks a corresponding icon.

At 306, the game application market finds a game ID corresponding to the icon clicked by the user.

At 308, the game application market, through a HTTP or another request, finds an entry code or an entry file such as main.js corresponding to game application ID from a server of a corresponding game application manufacturer.

The entry file such as main.js is an entry code portion of the game application that is developed by the game application manufacturer or a freelance game application developer who is in cooperation with the game application manufacturer. The file of main.js may include APIs of initialization rendering functions, such as createCanvas, getContext, etc., to initialize a low level rendering environment. The file of main.js may also include an import calling operation. The import calling operation may be used to load other JS files for an automatic execution. Then the game application starts. The user may operate contents in the game. That is, the user starts to play game. The logic of the game application is controlled by the JS codes of the game application. However, the low level rendering is still supported by the present techniques.

At 310, the entry file such as the main.js code is executed. The execution process may include the following. When the API of the initialization rendering functions in the main.js code is initially executed, the rendering target may be presented in Canvas window, embedded Surface, or any other forms. The parsing engine parses the API to obtain a corresponding initialization rendering function based on OPENGL and the parsed initialization rendering function is called to initialize the low level rendering environment.

At 312, the entry file such as the main.js code is executed. The execution process may further include the following. Other JS files corresponding to the game application ID are loaded according to the import calling.

For example, the other JS files may be a file dependent of the entry file such as main.js code. In an example implementation, the other JS files may be acquired by a require mechanism through methods such as a command require (xxx.js) or a command import (xxx.js), etc. to achieve the goal of loading other JS files.

At 314, the other JS files are executed. The execution process may include the following. When the API of the other JS file is executed, the parsing engine is used to parse the API into other corresponding rendering functions based on OPENGL. The other rendering functions are called to conduct graphic rendering to the rendering target.

In the conventional techniques, the developer of the game application client uses C++ or Java codes to develop graphic rendering applications and the GPU is used for graphic rendering. However, C++ or Java codes need compiling and require installation prior to execution. Thus, the graphic application under the conventional techniques needs installation after downloading and its updating is also troublesome.

The present techniques may use the JavaScript codes which are directly downloadable that may be parsed while executed. Thus, the JavaScript codes has advantages not found in C++ and Java codes, which do not require installation and may update and run at any time. Thus, the graphic applications developed by the present techniques do not necessarily require installation and update and operate easily.

Figure 4:
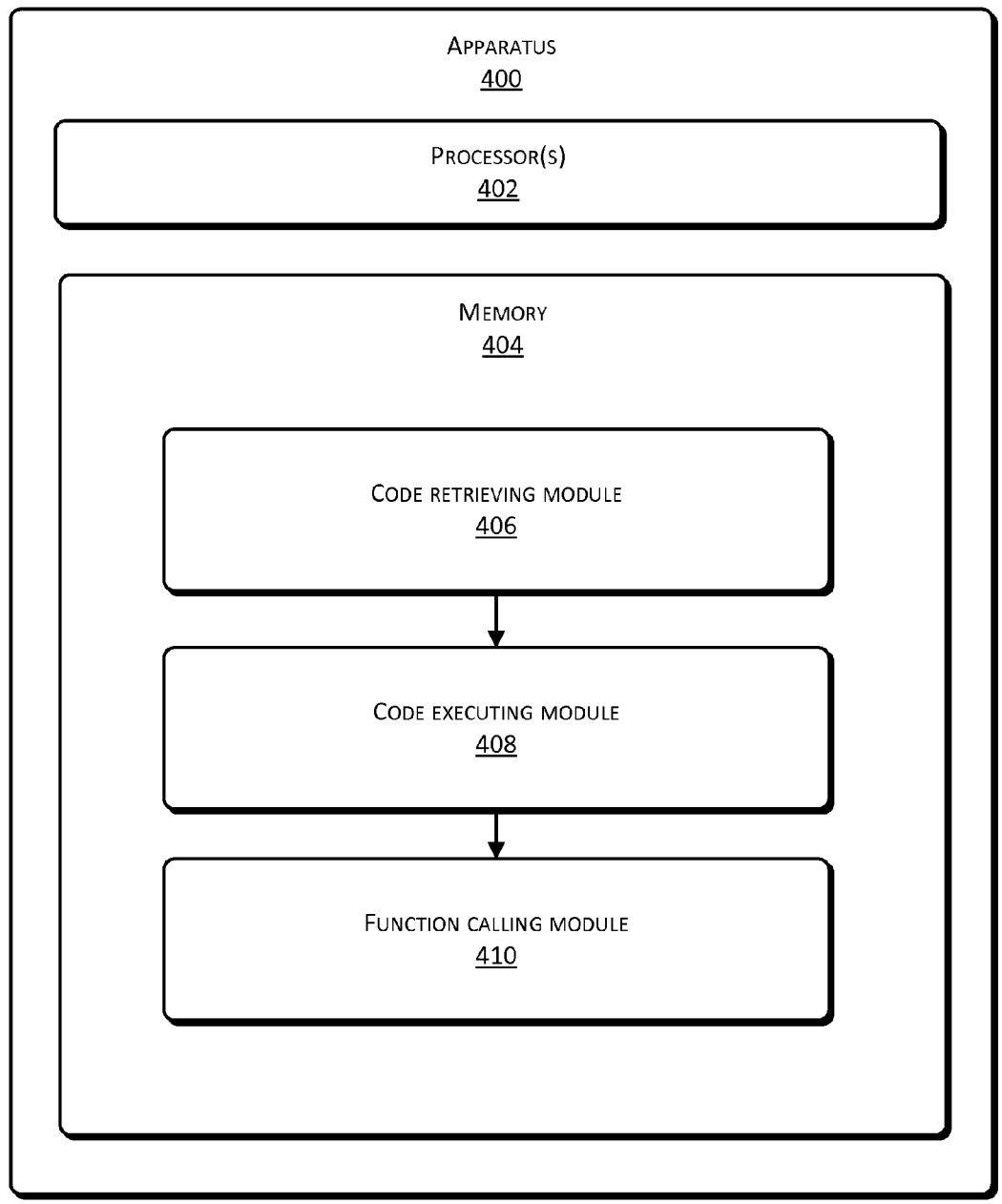
FIG. 4 is a block diagram of an example apparatus of graphics rendering at the mobile device according to another example embodiment of the present disclosure.

Corresponding to the above example method or system embodiment, the present disclosure also provides an example apparatus of graphic rendering at the mobile device. FIG. 4 is a block diagram of an example apparatus 400 of graphics rendering at the mobile device according to another example embodiment of the present disclosure.

The apparatus 400 may include one or more processor(s) 402 and memory 404. The memory 404 is an example of computer-readable media. As used herein, "computer-readable media" includes computer storage media and communication media.

Computer storage media includes volatile and non-volatile, removable and non-removable media implemented in any method or technology for storage of information such as computer-executed instructions, data structures, program modules, or other data. In contrast, communication media may embody computer-readable instructions, data structures, program modules, or other data in a modulated data signal, such as a carrier wave. As defined herein, computer storage media does not include communication media. The memory 404 may store therein program units or modules and program data.

In the example of FIG. 4, the memory 404 may store therein a code retrieving module 406, a code execution module 408, and a function calling module 410.

The code retrieving module 406 retrieves JavaScript codes of a graphic application. The JavaScript codes include an API corresponding to a rendering function based on OPENGL. The API has a format complying with a standard of HTML5 Canvas.

The code executing module 408 executes the JavaScript codes at a parsing engine. When the API of the JavaScript codes is executed, the parsing engine parses the API to obtain a corresponding rendering function based on OPENGL.

The function calling module 410 calls the parsed rendering function to conduct graphic rendering to a rendering target.

For example, the apparatus 400 may further include an encapsulating module that encapsulates the rendering function based on OPENGL into or with the API. For instance, the encapsulating module, according to an expansibility of the parsing engine, encapsulates the rendering function based on OPENGL into the corresponding API. The API is exposed to a JavaScript developer, and the API has a format complying with the standard of HTML5 Canvas.

For example, the rendering function is an interface function which is obtained based on an encapsulation of a function based on an OPENGL format.

For example, the function calling module 410 may further include a second parsing sub-module and a calling sub-module. The second parsing sub-module conducts a second parsing to the parsed rendering function to obtain a function with a corresponding OPENGL format. The calling sub-module calls the parsed function with the OPENGL format to conduct graphic rendering to the rendering target.

For another example, the rendering function may include an initialization rendering function that initializes a low level rendering environment.

For another example, the apparatus 400 may further include an environment initializing module, an evaluating module, and a rendering process optimization strategy adjusting module. The environment initializing module, based on a platform attribute of the mobile device, calls the initialization rendering function to obtain corresponding rendering data. The rendering data may contain device hardware information.

The evaluating module evaluates a hardware capability of the mobile device according to the device hardware information. The rendering process optimization strategy adjusting module adjusts an optimization strategy of a rendering process according to the hardware capability of the mobile device. The calling module, based on the adjusted optimization strategy of the rendering process, calls the rendering function to conduct graphic rendering.

The description of the example apparatus embodiment of the present disclosure is relatively brief as the techniques in the example apparatus embodiment are similar to those of the example method embodiments. The related techniques in the example apparatus embodiments may be referred to those in the example method embodiments of the present disclosure.

One of ordinary skill in the art should understand that the embodiments of the present disclosure can be methods, systems, apparatuses (devices), or the programming products of computers. Therefore, the present disclosure can be implemented by hardware, software, or in combination of both. In addition, the present disclosure can be in a form of one or more computer programs containing the computer-executable codes or instructions which can be included or stored in the computer storage medium (including but not limited to disks, CD-ROM, optical disks, etc.).

The present disclosure is described by referring to the flow charts and/or block diagrams of the method, device (system) and computer program of the embodiments of the present disclosure. It should be understood that each flow and/or block and the combination of the flow and/or block of the flowchart and/or block diagram can be implemented by computer-executable instructions. These computer-executable instructions may be provided to the general computers, specific computers, embedded processor or any other programmable data devices including one or more processors to generate a machine, so that a device of implementing one or more flows of the flow chart and/or one or more blocks of the block diagram can be generated through the instructions operated by a computer or other programmable data processors.

The computer-executable instructions may also be stored in one or more computers or any other programmable data processing devices that cause the computers or any other programmable data processing devices to work in a specific way so that the computer-executable instruction stored in the computer storage media may implement functionalities designated by one or more flows and/or blocks of the flowcharts and/or block diagrams.

The computer-executed instructions may also be loaded into the computer or any other programmable data processing devices to cause the computer or any other programmable data processing devices to perform a series of operations to implement computer processing. Thus, the computer-executed instruction performed at the computer or any other programmable data processing devices implements implement functionalities designated by one or more flows and/or blocks of the flowcharts and/or block diagrams.

Although the present disclosure describes some example embodiments, one of ordinary skill in the art may make variations or modifications after he/she obtains basic creative concept of the present disclosure. Thus, the claims should be interpreted to protect the example embodiments and any other variation or modification fallen into the present disclosure.

The example embodiments of the present disclosure are described progressively. Each example embodiments focuses on differences from the other example embodiments. The same and similar portions among the various example embodiments may be referred to each other.

The present disclosure provides the example methods and apparatuses of graphic rendering at the mobile device. The present disclosure uses the example embodiments to illustrate the principles and implementations of the present techniques. The example embodiments are only used to help understand the methods and concepts of the present disclosure. It should be understood that various modifications, changes or equivalent replacements may be made by one of ordinary skill in the art in accordance with the principles of the present disclosure. Thus, the specification shall not be used as a limitation to the present disclosure.

What is claimed is:

1. A method comprising: obtaining JavaScript codes of a graphic application, the JavaScript codes including an application programming interface (API) corresponding to a rendering function based on open graphic library (OPENGL);
   executing the API of the JavaScript codes at a parsing engine to conduct a first parsing of the API into a corresponding first initialization rendering function with a corresponding OPENGL format, the first initialization rendering function being called to initialize a low level rendering environment and to obtain device hardware information;
   adjusting an optimization strategy of a rendering process based on obtaining the device hardware information;
   executing the API of the JavaScript codes at the parsing engine to conduct a second subsequent parsing of the API into a second rendering function with a corresponding OPENGL format;
   based on adjusting the optimization strategy of the rendering process, calling the second rendering function to conduct the rendering process to a rendering target, the rendering target being one of a buffer within a video card or a canvas within a browser; and
   displaying, on a display device, results of the rendering target.

2. The method as recited in claim 1, wherein a format of the API complies with a standard of HTML5 Canvas.

3. The method as recited in claim 1, further comprising encapsulating the first or the second initialization rendering function based on OPENGL into or with the API.

4. The method as recited in claim 3, wherein the encapsulating comprises, based on an extensibility of the parsing engine, encapsulating the first or the second initialization rendering function based on OPENGL into or with the API.

5. The method as recited in claim 1, wherein the first or the second initialization rendering function is an interface function that is obtained based on an encapsulation of a function based on a format of OPENGL.

6. The method as recited in claim 1, further comprising:
   evaluating a hardware capability of the mobile device according to the device hardware information,
   wherein adjusting the optimization strategy of the rendering process is further based on the hardware capability of the mobile device.

7. An apparatus comprising:
   a code retrieving module that obtains JavaScript codes of a graphic application, the JavaScript codes including an application programming interface (API) corresponding to a rendering function based on open graphic library (OPENGL), a format of the API complying with a standard of HTML5 Canvas;

a code execution module that executes the API of the JavaScript codes at a parsing engine to conduct a first parsing of the API into a corresponding first initialization rendering function with a corresponding OPENGL format, the first initialization rendering function being called to initialize a low level rendering environment and to obtain device hardware information;

a rendering process optimization strategy adjusting module that adjusts an optimization strategy of a rendering process based on obtaining the device hardware information;

a second parsing sub-module that executes the API of the JavaScript codes at the parsing engine to conduct a second subsequent parsing of the API into a second rendering function with a corresponding OPENGL format;

a calling sub-module that calls the second rendering function with the corresponding OPENGL format to conduct graphic rendering to the rendering target, the rendering target being one of a buffer within a video card or a canvas within a browser; and a display device that displays the rendering target thereon.

8. The apparatus as recited in claim 7, further comprising an encapsulating module that encapsulates the first or the second initialization rendering function based on OPENGL into or with the API.

9. The apparatus as recited in claim 8, wherein the encapsulating module based on an extensibility of the parsing engine, encapsulates the first or the second initialization rendering function based on OPENGL with the API.

10. The apparatus as recited in claim 7, wherein the first or the second initialization rendering function is an interface function that is obtained based on an encapsulation of a function based on a format of OPENGL.

11. The apparatus as recited in claim 7, further comprising:

an evaluating module that evaluates a hardware capability of the mobile device according to the device hardware information, wherein the rendering process optimization strategy adjusting module adjusts the optimization strategy of the rendering process is further based on the hardware capability of the mobile device.

12. One or more non-transitory computer storage media stored therein computer-executable instructions that are executable by one or more processors to perform operations comprising:

obtaining JavaScript codes of a graphic application, the JavaScript codes including an application programming interface (API) corresponding to a rendering function based on open graphic library (OPENGL), a format of the API complying with a standard of HTML5 Canvas;

when the API of the JavaScript codes is initially executed, using a parsing engine to conduct a first parsing of the API into a first initialization rendering function with a corresponding OPENGL format, the first initialization rendering function being called to initialize a low level rendering environment and to obtain device hardware information;

adjusting an optimization strategy of a rendering process based on obtaining the device hardware information;

executing the API of the JavaScript codes at the parsing engine to conduct a second subsequent parsing of the API into a second rendering function with a corresponding OPENGL format;

based on adjusting the optimization strategy of the rendering process, calling the second rendering function to conduct the rendering process to a rendering target, the rendering target being one of a buffer within a video card or a canvas within a browser; and causing to display, on a display device, the rendering target.

13. The one or more non-transitory computer storage media as recited in claim 12, wherein the calling comprises:

based on a platform attribute of a mobile device, calling the initialization rendering function to obtain rendering data, the rendering data including the device hardware information of the mobile device;

evaluating a hardware capability of the mobile device according to the device hardware information; and adjusting the optimization strategy of the rendering process according to the hardware capability of the mobile device.

14. The method as recited in claim 1, wherein the initialized low level rendering environment includes a brush being an initiator of a drawing command.

15. The method as recited in claim 1, wherein the initialized low level rendering environment includes a canvas being a mapping of memory.

16. The method as recited in claim 1, wherein the first initialization rendering function is called to further obtain rendering data.

17. The apparatus as recited in claim 7, wherein the initialized low level rendering environment includes one of a brush being an initiator of a drawing command, or a canvas being a mapping of memory.

18. The apparatus as recited in claim 7, wherein the first initialization rendering function is called to further obtain rendering data.

19. The one or more non-transitory computer storage media as recited in claim 12, wherein the initialized low level rendering environment includes one of a brush being an initiator of a drawing command, or a canvas being a mapping of memory.

20. The one or more non-transitory computer storage media as recited in claim 12, wherein the first initialization rendering function is called to further obtain rendering data.

* * * * *